(12) United States Patent
Rainbolt

(10) Patent No.: US 6,658,883 B1
(45) Date of Patent: Dec. 9, 2003

(54) INSULATION SYSTEM FOR A REFRIGERATOR/FREEZER UNIT

(75) Inventor: John Rainbolt, East Palo Alto, CA (US)

(73) Assignee: Sun-RG, East Palo Alto, CA (US)

( * ) Notice: Subject to any disclaimer, the term of this patent is extended or adjusted under 35 U.S.C. 154(b) by 0 days.

(21) Appl. No.: 10/285,367

(22) Filed: Oct. 30, 2002

(51) Int. Cl.[7] ............................................. F25D 23/12
(52) U.S. Cl. ........................... 62/263; 62/329; 62/262; 62/428; 62/507; 62/448
(58) Field of Search ..................... 62/262, 263, 329, 62/428, 507, 448

(56) References Cited

U.S. PATENT DOCUMENTS

| | | | | |
|---|---|---|---|---|
| 3,708,997 A | * | 1/1973 | McLaughlin ................ | 62/449 |
| 4,024,729 A | * | 5/1977 | Abate, Sr. et al. ............ | 62/263 |
| 4,290,416 A | * | 9/1981 | Maloney ..................... | 126/430 |
| 4,297,850 A | * | 11/1981 | Reed ........................... | 62/3 |
| 4,505,328 A | * | 3/1985 | Schmitt ........................ | 165/53 |
| 4,718,249 A | * | 1/1988 | Hanson ........................ | 62/263 |
| 5,187,950 A | * | 2/1993 | Weldon ........................ | 62/449 |
| 5,532,039 A | * | 7/1996 | Payne et al. ................. | 428/116 |
| 6,415,552 B1 | * | 7/2002 | Khosropour ................. | 52/27 |
| 2002/0184906 A1 | * | 12/2002 | Faries, Jr. .................... | 62/229 |

* cited by examiner

Primary Examiner—Timothy L. Maust
Assistant Examiner—Mark Shulman
(74) Attorney, Agent, or Firm—Perkins Coie LLP

(57) ABSTRACT

The present invention teaches systems and methods for improving the thermal efficiency of an existing refrigeration system having a heat exchanger comprising: an enclosure having side walls for enclosing at least a portion of the heat exchanger and being removably attached to the existing refrigeration system; a venting system for flowing cooling air within proximity with the heat exchanger and releasing the cooling air to an outside environment in order to increase a release of heat from the heat exchanger, wherein the enclosure is operable for reducing heating of an inside environment by the existing refrigeration system, or by functionally channelling the heat so it increases heat when desirable while minimizing the impact to refrigeration.

20 Claims, 8 Drawing Sheets

INSULATION SYSTEM FOR A REFRIGERATOR/FREEZER UNIT

FIELD OF THE INVENTION

The present invention pertains to an in-wall insulation system for refrigerators and freezers, in particular, a walled sleeve which greatly improves the insulating ability and energy savings of existing refrigerators/freezer units.

BACKGROUND OF INVENTION

Refrigerators and freezers are among the top three energy using appliances in the typical household. As such, they are often purchased based upon the energy consumption needs of the unit. The lower the amount of energy required to maintain the desired temperature, the more valuable it becomes to the consumer. Although highly energy efficient units are available, they are extremely expensive and thereby cost prohibitive to the average consumer. So much so that the most energy efficient units are often sold only to entities with special needs such as hospitals or research facilities.

For the purchaser of a new refrigerator or freezer, energy consumption is just one of many factors in their purchasing decision. Since most of the consumer refrigerators have similar energy consumption, initial cost, style, utility and expected life are usually the dominant factors in a purchase decision. Refrigerators and freezers are normally thought to be a fixture of a building to which they are attached and are not often moved after they are installed. As such, it is usually more important to the consumer that the refrigerator fit the needs of present space and style of its location.

One hidden cost associated with refrigerators is increased household cooling costs. During the summer, a typical refrigerator adds as much heat to a kitchen as a 1000 watt heater running five hours per day. The energy needed by an air conditioner to remove this excess heat can be as much as half the energy consumed by your refrigerator. This can increase the cost of running a refrigerator by as much as 50%.

PRIOR ART FIG. 1 shows one conventional refrigerator/freezer 10 in accordance with the prior art. Refrigerator 10 includes a top mounted motor and heat exchanger 12. Such a top mounted motor and heat exchanger system 12 provide increased efficiency over more conventional rear mounted units. None the less, such a refrigerator system 10 would benefit from increased efficiency and a decrease in waste heat being released to a kitchen area.

Because refrigerators are often the largest appliance in a household, the placement and location of the unit often restricts the design and available space in the kitchen. For existing households, the only option would be to locate the refrigerator outside its current space, or build an addition onto the household to accommodate the refrigerator unit. Such alternatives are often impracticable or costly.

The people who benefit the most from energy efficient refrigerators and freezers are the ones who do not in fact purchase the unit. These are people that inherit a unit as part of the house or apartment they rent. Since the renter does not have to consider the purchase price of the refrigerator or freezer, the only out of pocket expense involves paying for the operational cost of the unit. Likewise, if the owner or landlord is paying the cost of the utilities as part of the renters agreement, the cost of running the unit becomes important.

There is a need for a system by which an existing refrigerator or freezer can be made to be highly energy efficient. There is also a need for a cost effective way to provide for a means of locating the refrigerator or freezer unit outside of its current location. Futhermore, there is a need for reducing the heating affect of a refrigerator on a household, thereby reducing cooling costs.

SUMMARY OF THE INVENTION

The present invention provides a substantial increase in energy conservation to an existing refrigerator or freezer unit. Although the system can fit within the existing space available to the unit, the system is also capable of being used to create a new space into which the refrigerator or freezer can be positioned.

In one embodiment of the present invention, the insulating system is mounted directly to the walls or space into which the refrigerator is currently located. This forms a rigid frame of insulation that surrounds the unit.

In another embodiment of the present invention, the insulating system provides the space into which the refrigerator can be located. A hole would be cut in an existing outside wall and the insulating unit would be mounted onto the wall such that the unit will be located outside the house and the refrigerator would then be flush with the inside wall.

In yet another embodiment of the present invention, the insulation system provides for localized venting of heat. For refrigerators with top mounted heat exchangers, a would be cut in an existing ceiling to allow heat to escape upwards without contacting the sides or back of the refrigerator. Such an embodiment would have the added benefit of drawing heat upward out of a house due to the natural characteristic of low density heated air to rise. Such an increased flow of air would also increase the efficiency of a top mounted heat exchanger and the overall efficiency of a refrigerator.

Because refrigerators and freezers come in a variety of shapes and sizes, the insulating system is built to be significantly larger then the average size unit. This way, the system can be used with the greatest variety of refrigerators and freezers. A space is left between the cooling coils and the rear wall of the system in order to provide for air circulation. The air space created on the sides of the unit can then be further filled with insulation leaving the top and back spaces open for ventilation.

An adjustable inner curtain is connected to the rigid outer walls at the forward most part of the side and upper walls. This adjustable curtain is designed to fit against the refrigerator or freezer unit and cover the air space that surrounds the unit. The inner curtain will fit flush with the front of the refrigerator or freezer thereby giving the structure a seamless fit with both the unit and the surrounding wall.

In one embodiment of the present invention, the outside edge of the curtain, the edge which makes contact with the refrigerator unit, includes a magnetic edge. This ensures an air tight fit of the curtain along the entire length of the refrigerator unit.

In another embodiment of the present invention, the curtain is fitted with springs joining each part, such that the curtain is always drawn into contact with the refrigerator. This allows the curtain to maintain contact with the refrigerator and is particularly useful for refrigerator units with non-metallic outer shells.

In a further embodiment of the present invention, the curtain includes a screw or bolt type fastening system. The curtain is drawn into contact with the refrigerator unit by hand, at which time the fastening system is secured to main contact between the curtain and the refrigerator unit.

The insulation system also contains a set of vents to maintain air circulation around the radiator coils, usually located on the back of the unit. One vent is installed on the top portion of the inner lining, directly above the refrigerator or freezer. In the winter time, this vent would be opened to allow the heat from the radiator coils to enter the room where the unit is located. A small fan may be incorporated to aid this process. Depending upon the structure surrounding the insulation system, other vents can be located within the top wall and at the base of the back wall. During the summer, these vents will allow for the hot air from the coils to be vented out of the building or away from the area where the unit is located.

DETAILED DESCRIPTION OF THE PREFERRED EMBODIMENT

A first embodiment of the present invention includes an apparatus for improving the thermal efficiency of an existing refrigeration system having a heat exchanger comprising: an enclosure having side walls for enclosing at least a portion of the heat exchanger and being removably attached to the existing refrigeration system; a venting system for flowing cooling air within proximity with the heat exchanger and releasing the cooling air to an outside environment in order to increase a release of heat from the heat exchanger, wherein the enclosure is operable for reducing heating of an inside environment by the existing refrigeration system.

Figure 1:
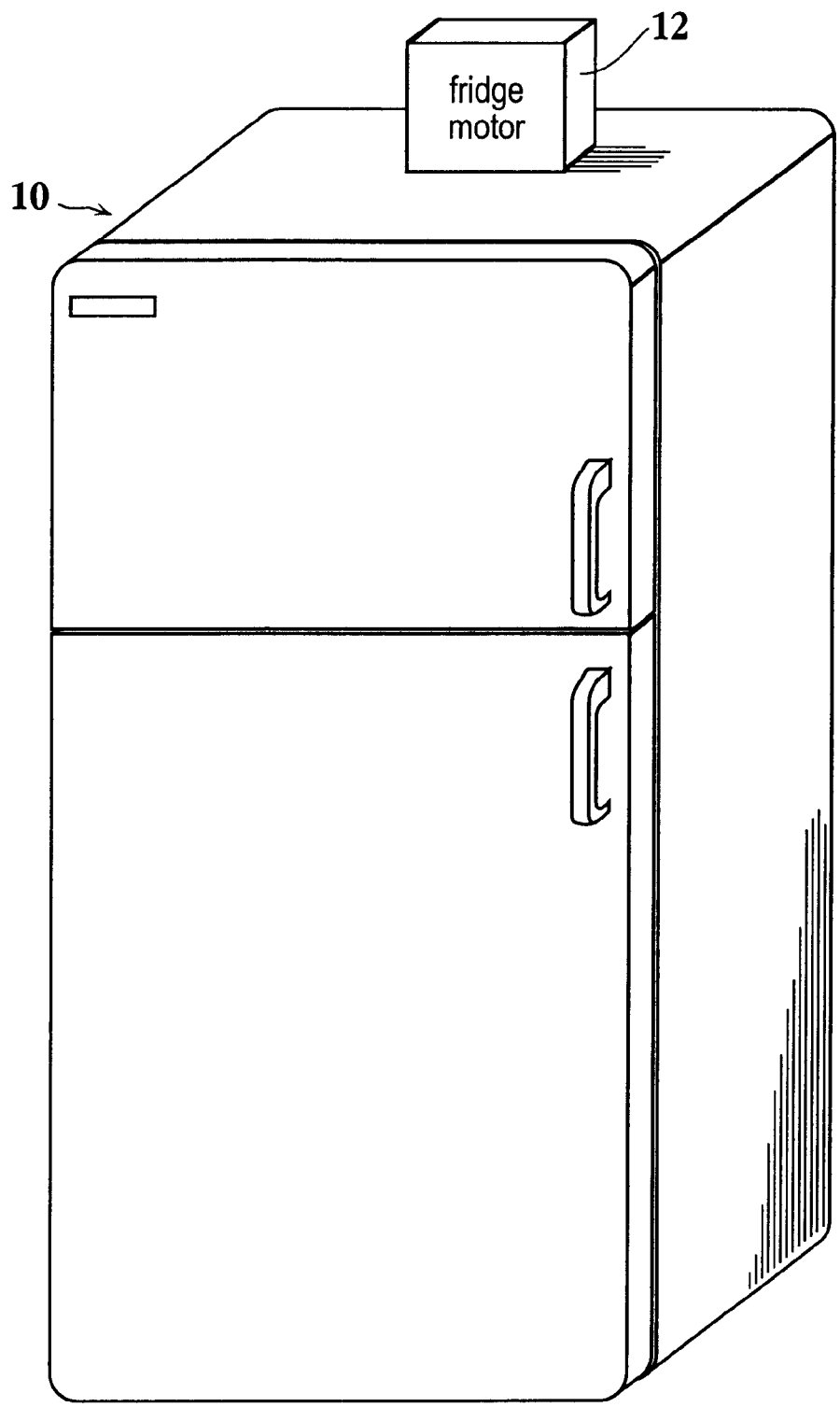
FIG. 1 illustrates a refrigerator in accordance with the prior art.
Figure 2A:
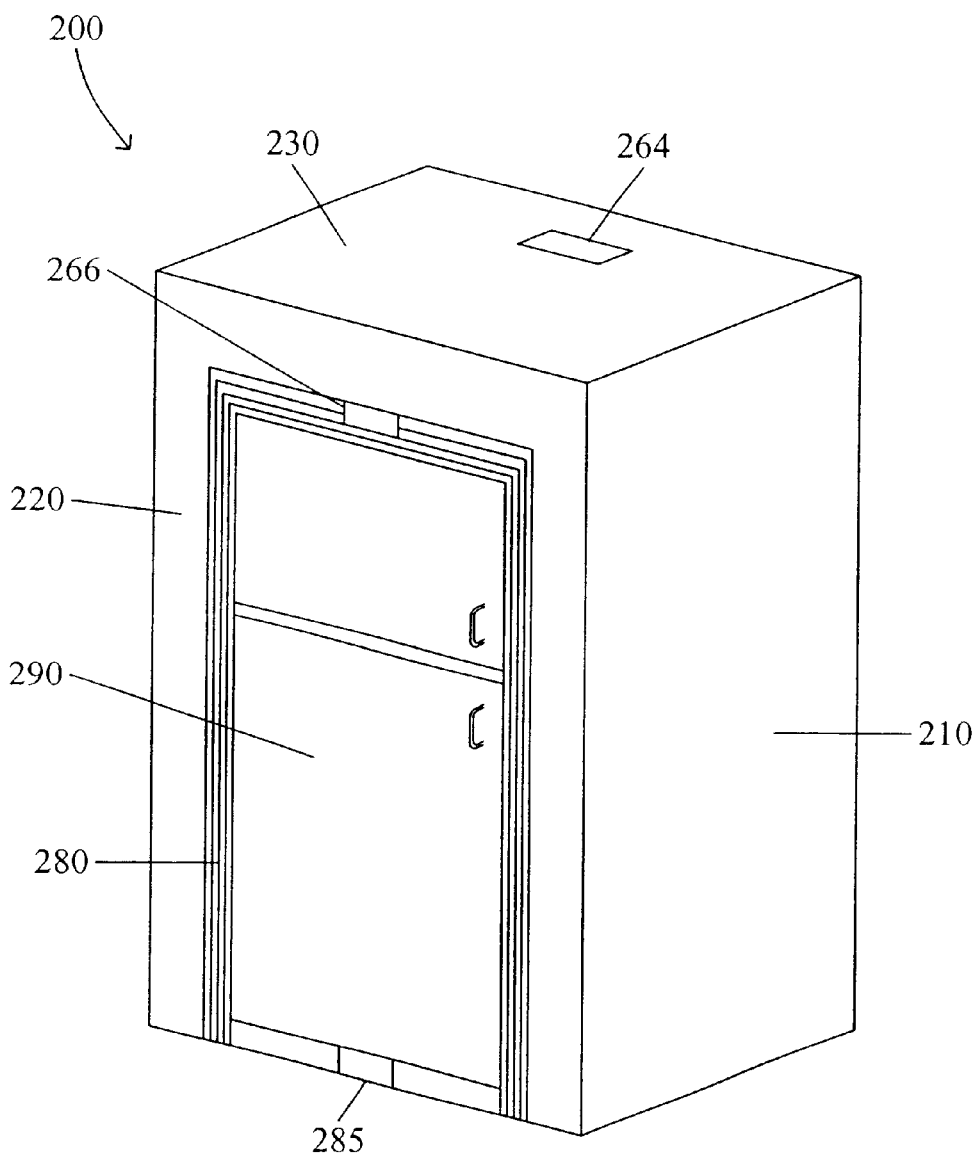
FIG. 2A is a perspective view of the insulating system encasing a refrigerator according to the present invention.

A first embodiment of the present invention is shown in FIG. 2A. FIG. 2A shows the insulating system 200 and a standard household refrigerator/freezer unit 290. Insulating system 200 comprises two side walls 210 and 220, a rear wall 250 and a top wall 230 forming a generally rectangular box having openings on two ends. A flexible curtain, indicated overall by 280, is attached to the forward most edge of the side walls 210 and 220 and the top wall 230.

The insulation system 200 surrounds the refrigerator/freezer unit 290 on four sides such that the front of the refrigerator/freezer unit is substantially flush with the front of the insulation system 200. The flexible curtain 280 is positioned such that when the refrigerator/freezer unit is installed, the flexible curtain 280 fits firmly against the front edge of the unit on its sides and top to form a seal such that only the front of the unit is visible outside the insulation system. One preferred embodiment could also contain a magnetic strip on the leading edge of the curtain where it makes contact with the refrigerator/freezer unit to aid its sealing capabilities. The interspace between the refrigerator/freezer unit and the walls of the insulation system 200 may then be filled with additional insulating material as needed which is then hidden by the flexible curtain 280. The insulating material would be positioned such that it would not interfere with the circulation of air across and away from the cooling coil of the refrigerator/freezer unit 290.

Figure 2B:
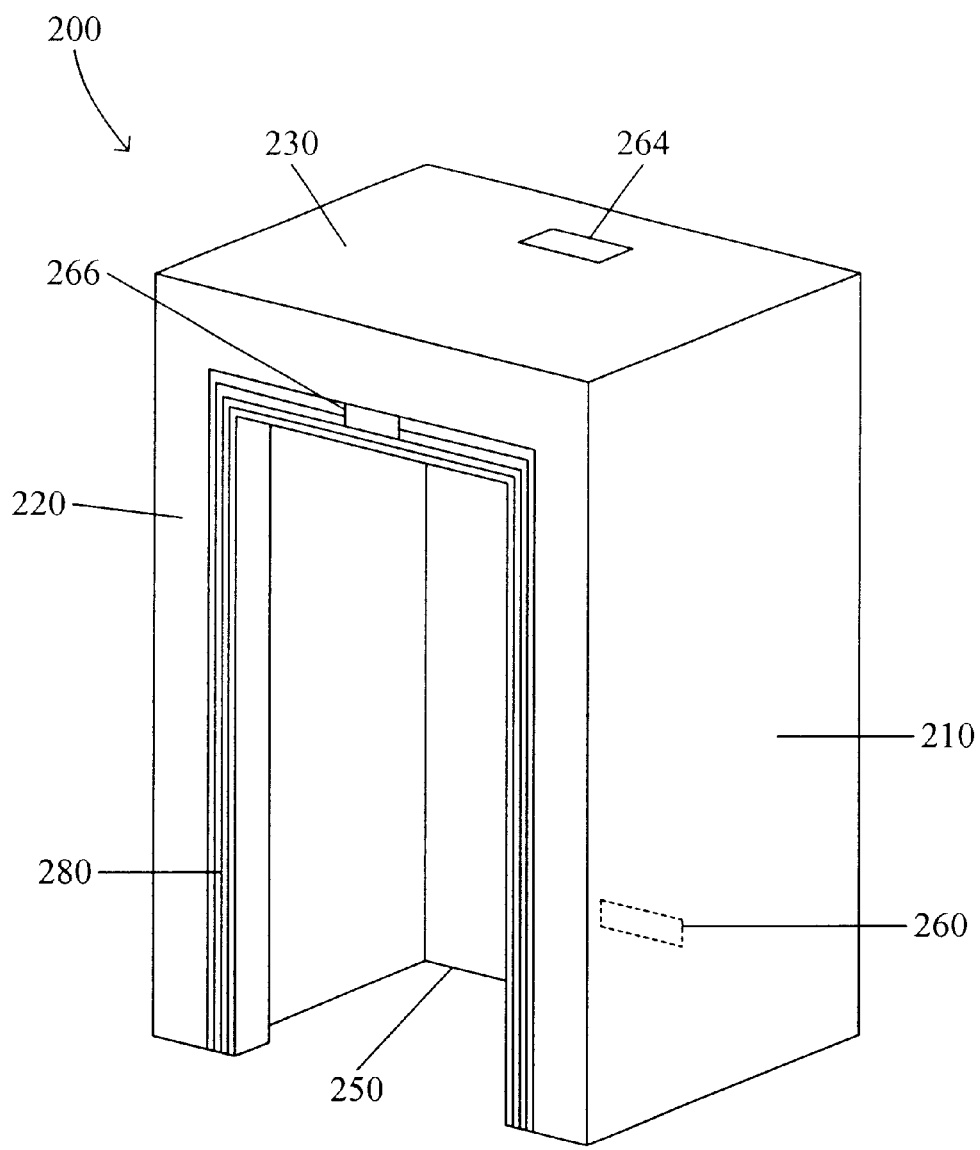
FIG. 2B is a perspective view of the insulating system according to the present invention.

FIG. 2B shows the insulating system 200. The insulation system 200 of FIG. 2B contains air vents 260, 264 and 266. Vent 260 is located on the bottom portion of rear wall 250 and vent 264 is located on the back portion of top wall 230. Vent 266 is located on the top portion of flexible curtain 280. The purpose of the vents is to allow for the circulation of air across the cooling coils of the refrigerator/freezer unit 290. The warm air created by the cooling coils can therefore be vented outside the insulation system through the vents individually or in combination. Vents 260 and 264 are intended to allow for the circulation of air between the insulation system and a location outside the room in which the refrigerator/freezer unit 290 and insulation system 200 are located. Vent 266 is intended to allow the air within the insulation system to be vented into the room in which the refrigerator/freezer unit is located. During wintertime operation, vents 260 and 264 are closed and vent 266 is open. The warm air from the coils is then vented into the room were the refrigerator/freezer unit 290 is located, thereby adding warm air to the surrounding environment. During summertime operation, vents 260 and 264 are open and vent 266 is closed. The warm air from the coils is then vented outside the room in which the refrigerator/freezer unit 290 is located, thereby avoiding the addition of warm air to the room.

While the preferred embodiment of FIG. 2B shows vent 260 being located on the back of the insulation system, the vent could also be positioned on the bottom of side wall 210 or 220. Alternatively, a vent could be located on the bottom of each side wall 210 and 220. The vents position and numbers will depend upon the location of the refrigerator/freezer unit and the location into which the circulating air is desired to be expelled. Likewise, vent 264 could be positioned on the upper portion of side walls 210 and 220 or on the upper portion of the back wall 250. Similarly, vent 264 could be replaced by two vents positioned at different locations on the top end of the insulation system 200. The same concerns that determine the location of vents 260 and 262 will drive the location and number of vent 264.

The air is circulated within the insulation system by a fan which is typically installed on the refrigerator/freezer unit for the purpose of cooling the coils and the compressor pump. If this fan is not included on the unit, or if the fan is not powerful enough to circulate the air through the insulation system 200, a fan 285 can be installed in the structure to aid in air circulation. The location of the fan will vary depending upon the design of the refrigerator/freezer unit 290, but will most likely be located on the bottom of the unit.

Figure 3:
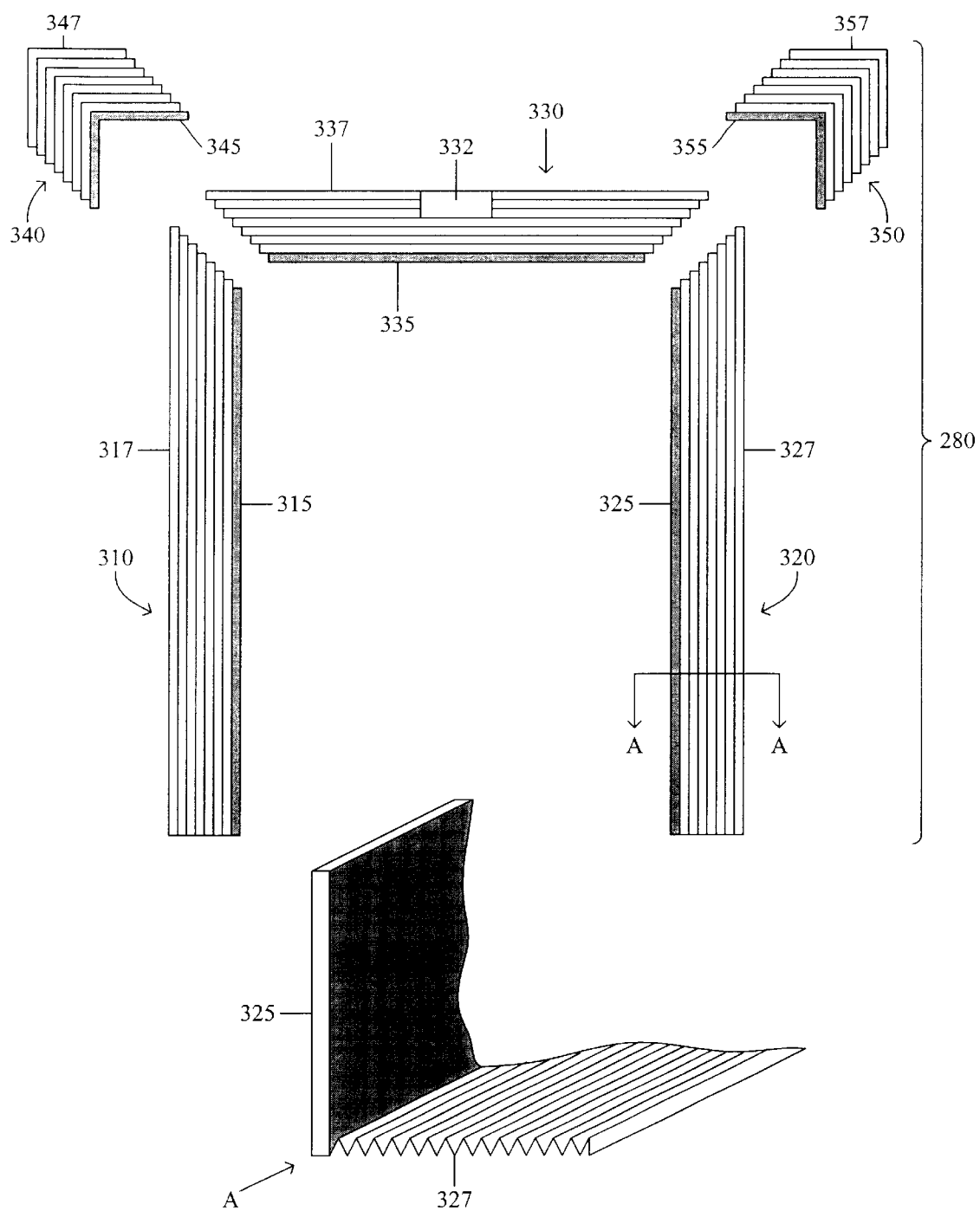
FIG. 3 is an exploded view of the flexible curtain, a component of the insulation system.

The embodiment in FIG. 3. shows an exploded view of the flexible curtain 300. The curtain is comprised of five sections 310, 320, 330, 340 and 350. Each section has a flexible portion, 315, 327, 337, 347 and 357 respectively and a rigid member, 315, 325, 335, 345 and attach to the refrigerator/freezer unit, while the opposing side of the flexible portions, 315, 327, 337, 347 and 357 are permanently attached to the walls of the insulation system 210, 220 and 230. The length of the corner sections, 340 and 350 will depend upon the smallest desired dimensions of the refrigerator/freezer unit to which the insulation system is designed to accommodate. The largest dimension of the unit would be obtained when the curtain is fully compressed against the walls 210 and 220 of the insulation system. The amount of compression of portion 330 will depend upon the size of vent 160. The smallest dimension would therefore be obtained when the curtain is fully extended such that the top most edges of 315 and 325 come into contact with the outer edges of 335. The greater the difference between the dimension of the largest and smallest refrigerator/freezer unit the system is intended to accommodate, the longer the corner sections, 340 and 350 will be required to be. The purpose of the corner unit is to fill the gap created when curtain sections 310, 320 and 330 are not fully extended out and thereby maintain the insulating properties of the insulation system for any given size refrigerator/freezer unit.

Figure 4:
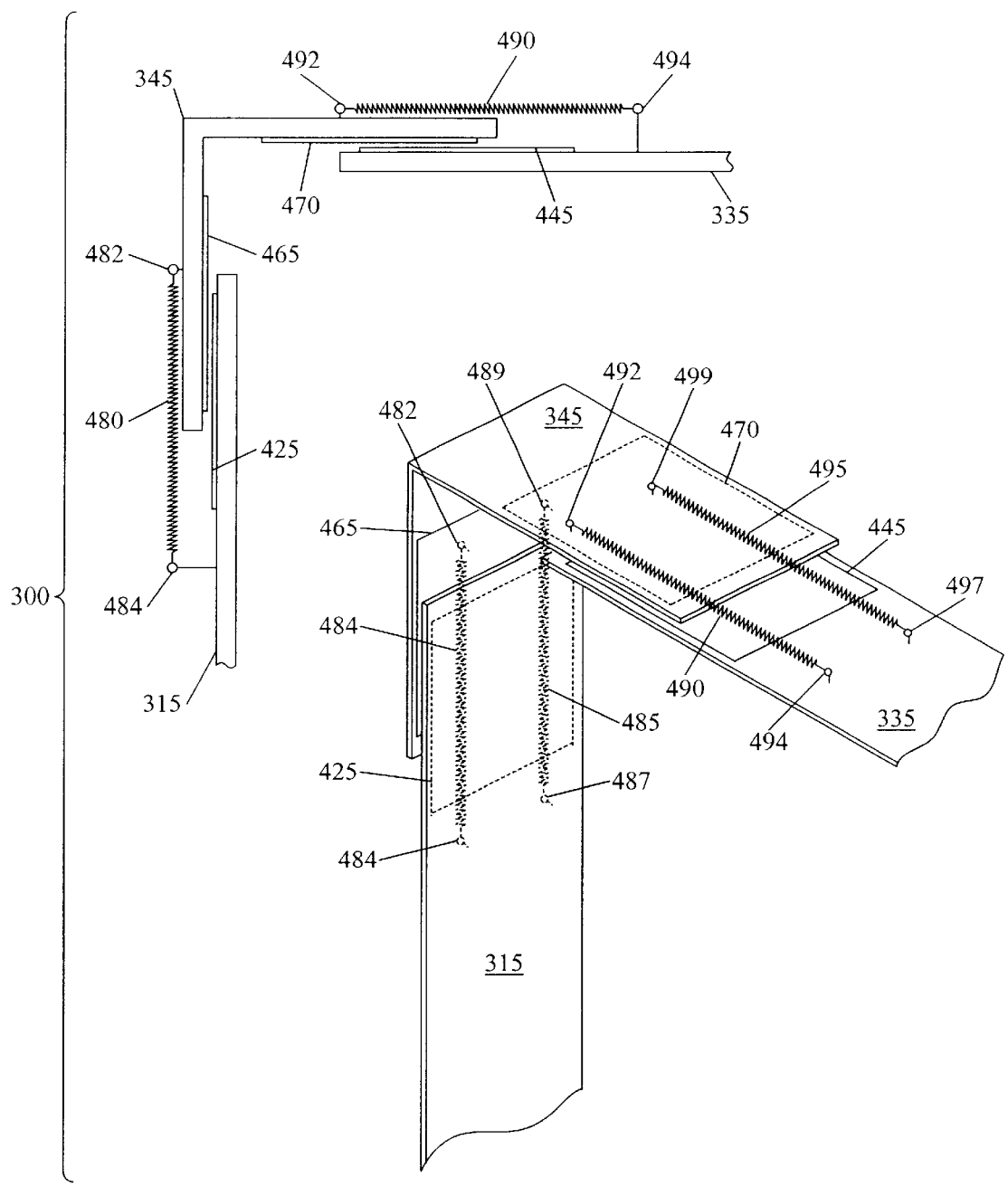
FIG. 4 is a partial exploded perspective view of flexible curtain illustrating the manner in which the component parts function.

FIG. 4. shows a close up view of one preferred embodiment of the mechanism which connects the flexible curtain 300 to the refrigerator/freezer unit. The mechanism is intended to maintain contact between the curtain sections 310, 320 and 330 and the corner sections 340 and 350 throughout a change of dimension in the flexible curtain 300. Springs 480, 485, 490 and 495 are attached to corner section 345 of the flexible curtain via connector rings 482, 489, 492 and 499 respectively. Springs 480 and 485 are also attached to side section 315 of the flexible curtain via connector rings 484 and 487 respectively. Similarly, springs 490 and 495 are attached to top section 335 of the flexible curtain via connector rings 494 and 497 respectively. As the curtain is increased or decreased in diameter, the springs 480, 485, 490 and 495 maintain contact between the corner section 345 and the top section 335 and side section 315. Silicon or similar low friction surfaces 425, 445, 465 and 470 are installed in order to prevent wearing and easy the movement of the curtain sections at points where they are in contact. This mechanism is identical to that which would be used on the other comer section 350 as between it and sections 330 and 320. In it's function, the flexible curtain would maintain a substantially rectangular shape for a variety of given dimensions.

Figure 5:
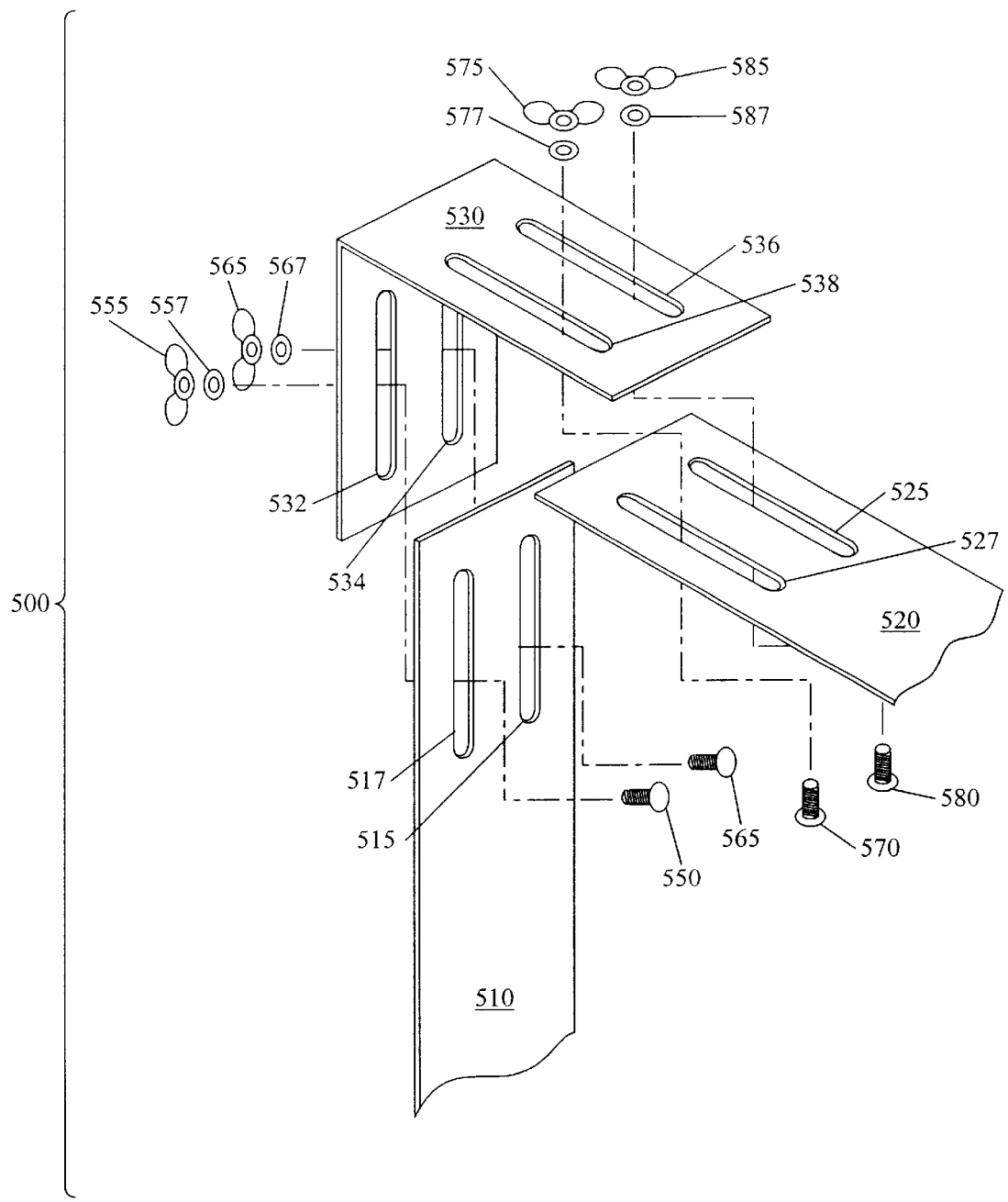
FIG. 5 is a partial exploded perspective view of flexible curtain illustrating the manner in which the component parts function.

FIG. 5. shows an alternate preferred embodiment of the mechanism which connects the flexible curtain 500 to the refrigerator/freezer unit 290. The mechanism is intended to maintain contact between the curtain sections 510 and 520 and the corner section 530 throughout a change of dimension in the flexible curtain 500. Curtain sections 510 and 520 each have a set of slots, 517, 515 and 527, 525 respectively, that correspond to the slots 532, 534, 538 and 536 located on corner section 530. Each slot, 517, 515, 527, 525, 532, 534, 538 and 536 are wide enough to accommodate screws 550, 560, 570 and 580, and will vary in length depending upon the size of the refrigerator or freezer unit the insulating system is designed to accommodate. Once the refrigerator unit is installed, and the curtains are drawn into contact with the unit, wing nuts 555, 565, 575 and 585, together with washers 557, 567, 577 and 587 are secured to screws 550, 560, 570 and 580 respectively. This mechanism is identical to that which would be used on the other corner section (not shown) and its corresponding curtain sections. In it's function, the flexible curtain would maintain a substantially rectangular shape for a variety of given dimensions.

Figure 6:
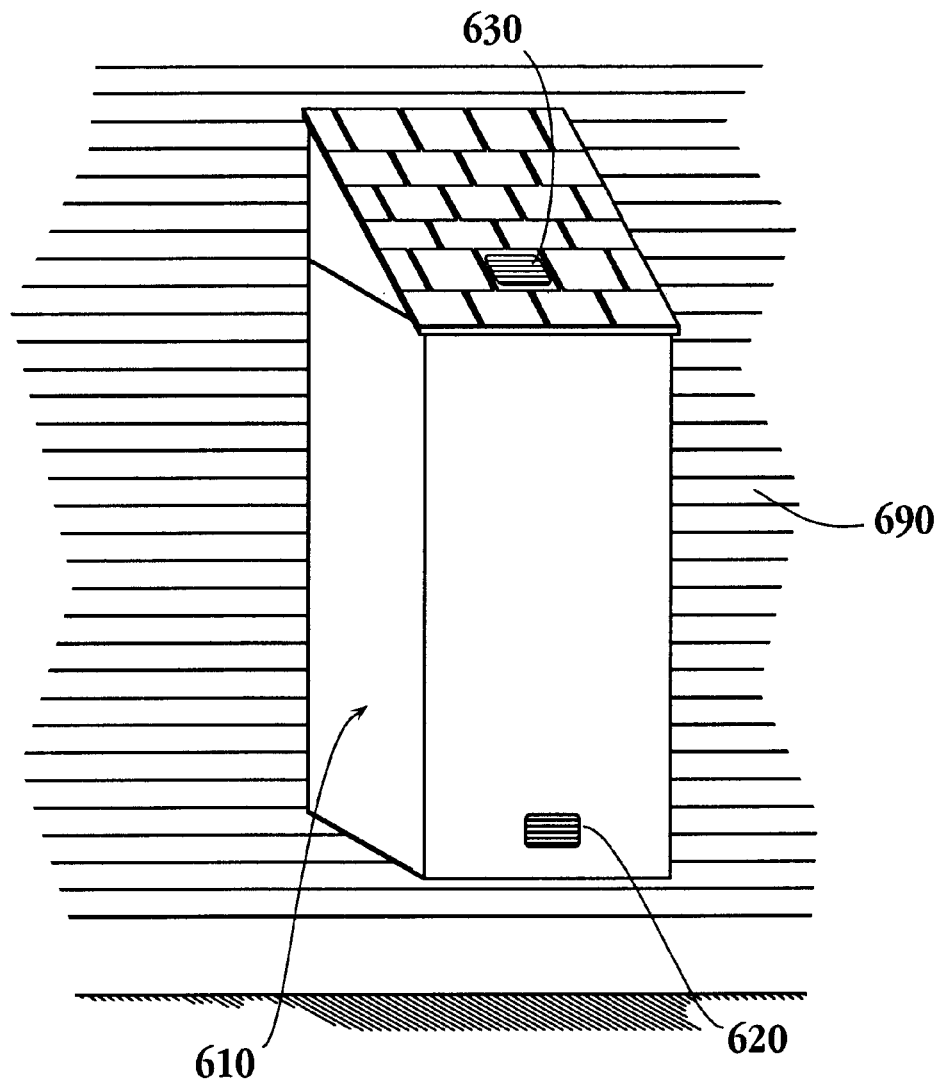
FIG. 6 is a perspective view of an embodiment of the present invention whereby the insulating unit is mounted to an outside wall.
Figure 7:
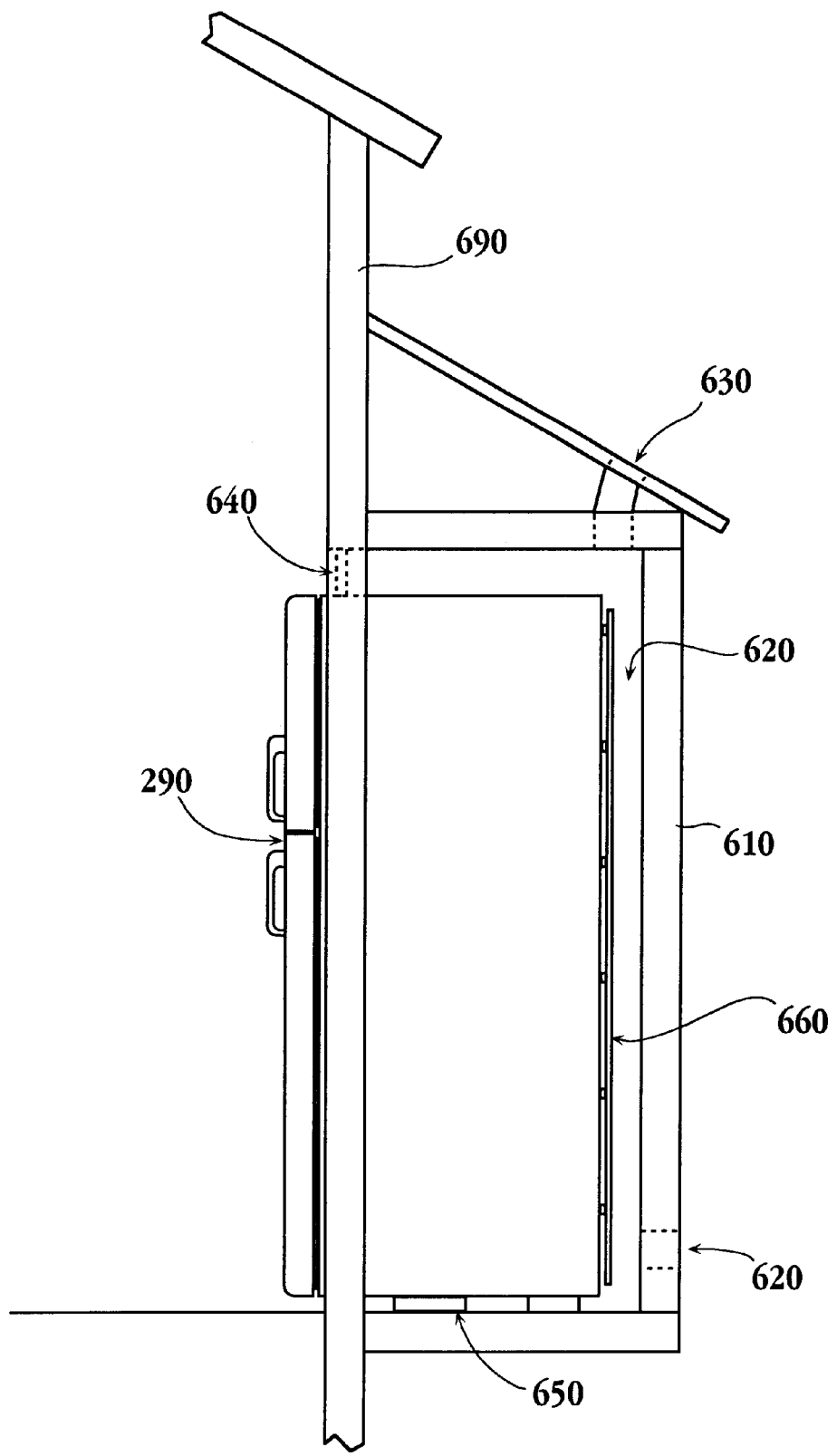
FIG. 7 is a cutaway view illustrating the ventilation system of the present invention.

FIGS. 6 & 7, illustrate one preferred embodiment of the present invention in which the insulating system is attached to the wall of an existing structure. FIG. 6 shows an outside view of one embodiment of the present invention. A hole is cut in an existing wall 690, and the insulating system is mounted within the hole such that the walls of the insulating system 610 are located outside the existing wall 690 and flush with the inside of the wall 690. Such an insulating system 610 would provide a seamless addition to a building structure. Vents 620 and 630 are located on the top and bottom respectively of the insulating system walls 610. By using a lower vent 620 and an upper vent 630 improved cooling air flow is achieved. Cool high density air will enter vent 620, be heated by refrigerator 290 (FIG. 2A). Such heating will cause the high density air to become boyant and rise up through upper vent 630, thereby creating a flow of cooling air through insulating system 610. Such a cooling flow would further increase the energy efficiency over conventional refrigerators.

FIG. 7 shows a cut away view of the preferred embodiment. The refrigerator unit 290 is located with in the insulating walls 610 such that a small air space 670 is left between the refrigerator cooling coils 660 and the back wall of the insulating system. Vents 620, 630 and 640 allow for air to flow across the cooling coils 660, aided by fan 650. During wintertime operation, vents 620 and 630 are closed and vent 640 is open. The warm air from the coils 660 is circulated within the insulation system via the fan 650 where it is then vented into the room were the refrigerator/freezer unit 290 is located. The warm air then enters the room thereby adding heat to the surrounding environment. During summertime operation, vents 620 and 630 are open and vent 640 is closed. The warm air from the coils, circulated by fan 650 is then vented outside the room in which the refrigerator/freezer unit 290 is located, thereby avoiding the addition of warm air to the room.

Alternatively refrigerator unit 290 may have top mounted coils (not shown). An insulating unit for refrigerator unit having top mounted coils may only be required to encase the top portion of the refrigerator unit and the coils in order to greatly increase thermal efficiency, thus reducing the required overall bulk of insulating unit 610.

While the invention has been particularly shown and described with reference to certain preferred embodiments, it will be understood by those skilled in the art that various alterations and modifications in form and detail may be made therein. Accordingly, it is intended that the following claims cover all such alterations and modifications as fall within the true spirit and scope of the invention.

What is claimed is:

1. A refrigeration insulation system providing energy efficient refrigeration when applied over a standard refrigeration unit, the insulation system comprising,
 a) two vertically opposed walls each having a front edge,
 b) a rear vertical wall,
 c) and an upper horizontal wall having a front edge,
 d) said walls defining a generally rectangular four sided container,
 e) a three sided flexible curtain is mounted to the said front edge of said vertical walls and the said front edge of said upper wall defining a generally rectangular shape wherein the diameter of side curtain can vary in dimensions,
 f) said upper wall including at least one upper vent,
 g) said rear wall including at least one lower vent, and
 h) said flexible curtain having a curtain vent.

2. A refrigeration insulation system providing energy efficient refrigeration when applied over a standard refrigeration unit, the insulation system comprising,
 a) two vertically opposed walls each having a front edge,
 b) a rear vertical wall, c) and an upper horizontal wall having a front edge, d) said walls defining a generally rectangular four sided container, e) a three sided flexible curtain is mounted to the said front edge of said vertical walls and the said front edge of said upper wall defining a generally rectangular shape wherein the diameter of side curtain can vary in dimensions;

f) said upper wall including at least one upper vent, g) said rear wall including at least one lower vent, and h) said flexible curtain having a curtain vent and a magnetic edge.

3. An insulation system recited in claim 1, wherein said walls include insulating material.

4. An insulation system recited in claim 1, wherein an auxiliary fan is installed underneath or at the bottom of said refrigerator unit.

5. An insulation system recited in claim 1, wherein air is drawn into said insulation system through said at least one lower vent and expelled through said at least one upper vent.

6. An insulation system recited in claim 1, further comprising an air circulating system configured to direct air past a heat exchanger portion of a refrigeration system.

7. An insulation system recited in claim 6, wherein said air circulation system includes a fan for directing air past said heat exchange portion.

8. An insulation system recited in claim 1, further comprising an front vent providing a portal through said front edge of said upper horizonal wall and configured to provide air heated by said standard refrigeration unit to an interior area of a building, wherein said front vent is operable to be opened and closed in order to control a flow of said heated air into said interior area.

9. An insulation system recited in claim 1, wherein said upper and lower vents open to an outside environment.

10. A refrigeration insulation system providing energy efficient refrigeration when applied over a standard refrigeration unit, the insulation system comprising, a) two vertically opposed walls each having a front edge, b) a rear vertical wall, c) an upper horizontal wall having a front edge, d) and a lower horizontal wall having a front edge, e) said walls defining a generally rectangular five sided container with said front edges forming an front opening opposite said rear vertical wall, f) said front edges being joined to an external wall of a building, wherein said external wall has a wall opening equal in size and shape to said front opening of said container, g) a three sided flexible curtain is mounted to the said front of edge of said vertical walls and to the said front edge of said upper wall defining a generally rectangular shape wherein the diameter of side curtain can vary in dimensions, h) said upper wall including at least one upper vent, i) said rear wall including at least one lower vent, and j) said flexible curtain having a curtain vent.

11. A refrigeration insulation system providing energy efficient refrigeration when applied over a standard refrigeration unit, the insulation system comprising, a) two vertically opposed walls each having a front edge, b) a rear vertical wall, c) an upper horizontal wall having, a front edge, d) and a lower horizontal wall having a front edge, e) said walls defining a generally rectangular five sided container with said front edges forming an front opening opposite said rear vertical wall, f) said front edges being joined to an external wall of a building, wherein said external wall has a wall opening equal in size and shape to said front opening of said container, g) a three sided flexible curtain is mounted to the said front of edge of said vertical walls and to the said front edge of said upper wall defining a generally rectangular shape wherein the diameter of side curtain can vary in dimensions, h) said upper wall including at least one upper vent, i) said rear wall including at least one lower vent, and j) said flexible curtain having a curtain vent and a magnetic edge.

12. An insulation system recited in claim 10, wherein said walls include insulating material.

13. An insulation system recited in claim 10, wherein an auxiliary fan is installed underneath said refrigerator unit.

14. A refrigeration insulation system providing energy efficient refrigeration when applied over a standard refrigeration unit, the insulation system comprising, a) two vertically opposed walls each having a front edge, b) a rear vertical wall, c) an upper horizontal wall having a front edge, d) and a lower horizontal wall having a front edge, e) said walls defining a generally rectangular five sided container with said front edges forming an front opening opposite said rear vertical wall, f) said front edges being joined to an external wall of a building, wherein said external wall has a wall opening equal in size and shape to said front opening of said container, g) a three sided flexible curtain is mounted to the said front of edge of said vertical walls and to the said front edge of said upper wall defining a generally rectangular shape wherein the diameter of side curtain can vary in dimensions, h) said upper wall including at least one upper vent, i) said rear wall including at least one lower vent wherein outside air is drawn into said insulation system through said at least one lower vent, heated by a heat exchanger and exits said insulation system through said at least one upper vent, and j) said flexible curtain having a curtain vent.

15. An apparatus for improving the thermal efficiency of an existing refrigeration system having a heat exchanger comprising:

an enclosure having side walls for enclosing at least a portion of said heat exchanger and being removably attached to said existing refrigeration system;

a venting system for flowing cooling air within proximity with said heat exchanger and releasing said cooling air to an outside environment in order to increase a release of heat from said heat exchanger, wherein said enclosure is operable for reducing heating of an inside environment by said existing refrigeration system.

16. The apparatus of claim 15 wherein said outside environement includes an area outside of a building and said inside environement includes an area inside of said building.

17. The apparatus of claim 15 wherein said enclosure includes a flexible skirt for creating a thermal seal with at least a portion of said cooling system.

18. The apparatus of claim 15 wherein said heat exchanger is located on a top surface of said cooling system, and wherein said enclosure does not enclose a side surface of said cooling system.

19. The apparatus of claim 15 wherein said insulation system is adabtable to refrigerations systems having widely varying dimensions.

20. The apparatus of claim 16 wherein external dimensions of said insulation system are adabtable in order to enable said insulation system to occupy widely varying areas such that said insulation system is useable within buildings having various internal layouts.

* * * * *